(12) United States Patent
Yokoyama et al.

(10) Patent No.: US 8,981,612 B2
(45) Date of Patent: Mar. 17, 2015

(54) ROTOR AND MOTOR

(71) Applicant: ASMO Co., Ltd., Shizuoka-ken (JP)

(72) Inventors: Seiya Yokoyama, Toyohashi (JP); Yoji Yamada, Hamamatsu (JP)

(73) Assignee: ASMO Co., Ltd., Shizuoka-ken (JP)

( * ) Notice: Subject to any disclaimer, the term of this patent is extended or adjusted under 35 U.S.C. 154(b) by 308 days.

(21) Appl. No.: 13/662,781

(22) Filed: Oct. 29, 2012

(65) Prior Publication Data

US 2013/0113329 A1     May 9, 2013

(30) Foreign Application Priority Data

Oct. 31, 2011   (JP) ................................. 2011-239518
Nov. 11, 2011   (JP) ................................. 2011-247903

(51) Int. Cl.
    *H02K 21/12*     (2006.01)
    *H02K 1/27*     (2006.01)

(52) U.S. Cl.
    CPC ................ *H02K 1/27* (2013.01); *H02K 1/2706* (2013.01)
    USPC ............ 310/156.68; 310/156.69; 310/156.71; 310/263

(58) Field of Classification Search
    CPC .............................. H02K 1/27; H02K 1/2706
    USPC .................... 310/156.68, 156.69, 156.71, 263
    See application file for complete search history.

(56) References Cited

U.S. PATENT DOCUMENTS

| | | | |
|---|---|---|---|
| 4,388,545 A * | 6/1983 | Honsinger et al. | ....... 310/156.66 |
| 4,959,577 A | 9/1990 | Radomski | |
| 5,663,605 A | 9/1997 | Evans et al. | |
| 6,013,967 A * | 1/2000 | Ragaly et al. | .................. 310/263 |
| 6,455,978 B1 * | 9/2002 | Krefta et al. | .................. 310/263 |
| 6,538,358 B1 | 3/2003 | Krefta et al. | |
| 7,569,968 B2 | 8/2009 | Nakamura | |
| 7,737,602 B2 | 6/2010 | Harada | |
| 7,750,529 B2 | 7/2010 | Tajima et al. | |
| 8,624,459 B2 | 1/2014 | Tokizawa | |
| 2003/0102758 A1 | 6/2003 | Kusase et al. | |
| 2007/0046139 A1 | 3/2007 | Ishizuka | |

(Continued)

FOREIGN PATENT DOCUMENTS

| | | |
|---|---|---|
| JP | 5-43749 U | 6/1993 |
| JP | 9327139 | 12/1997 |

(Continued)

OTHER PUBLICATIONS

Notice of Allowance and Fee Due related to corresponding U.S. Appl. No. 13/662,762.

*Primary Examiner* — Thanh Lam
(74) *Attorney, Agent, or Firm* — Kilpatrick Townsend & Stockton LLP

(57) ABSTRACT

A rotor is provided with a first rotation member having a plurality of first claw poles in a circumferential direction and a second rotation member having a plurality of second claw poles in a circumferential direction. By of fitting each second claw pole in a cutout portion between first claw poles and by fitting each first claw pole in a cutout portion between second claw poles, the first rotation member and the second rotation member are assembled to each other. At least either one of the first rotation member and the second rotation member is formed of a magnet. Based on a magnetic field generated by the magnet, the first claw poles and the second claw poles have alternating north poles and south poles in the circumferential direction.

15 Claims, 13 Drawing Sheets

(56) References Cited

U.S. PATENT DOCUMENTS

| | | |
|---|---|---|
| 2007/0267938 A1* | 11/2007 | Nishimura .................... 310/263 |
| 2008/0018190 A1 | 1/2008 | Takahata et al. |
| 2008/0048516 A1* | 2/2008 | Oowatari et al. ........ 310/156.71 |
| 2008/0088199 A1 | 4/2008 | Hamada |
| 2009/0218907 A1* | 9/2009 | Kusase .......................... 310/263 |
| 2010/0148612 A1 | 6/2010 | Takemoto et al. |
| 2010/0226803 A1 | 9/2010 | Tajima et al. |
| 2013/0057102 A1 | 3/2013 | Yamada et al. |
| 2013/0069471 A1 | 3/2013 | Kadiri et al. |
| 2013/0106208 A1* | 5/2013 | Yamada et al. ................. 310/43 |
| 2013/0106229 A1 | 5/2013 | Goto et al. |
| 2013/0106230 A1* | 5/2013 | Morita et al. ............ 310/156.66 |
| 2013/0113323 A1 | 5/2013 | Yamada et al. |
| 2013/0121856 A1* | 5/2013 | Yamada et al. ............ 417/410.1 |
| 2013/0147288 A1 | 6/2013 | Jack et al. |
| 2013/0270928 A1 | 10/2013 | Nord |

FOREIGN PATENT DOCUMENTS

| | | |
|---|---|---|
| JP | 2012-115085 A | 6/2012 |
| WO | 2012/067223 | 5/2012 |

* cited by examiner

Direction of magnetic flux →

ROTOR AND MOTOR

BACKGROUND

This disclosure relates to a Lundell-type rotor and motor of a magnetic field system.

As one type of conventional motors, a motor having a Lundell-type rotor 81 of a magnetic field system as illustrated in FIG. 24, that is, a rotating electrical machine is known. See Japanese Laid-Open Utility Model Publication No. 5-43749, for example. The rotor 81 of this type of motor is provided with rotor iron cores 82 and 83 made of iron and having a plurality of claw poles 82a and 83a in a circumferential direction and a disk magnet 84 arranged between the rotor iron cores 82 and 83. Since each of the claw poles 82a and 83a alternately generates different magnetic poles in the circumferential direction by using a magnetic field of the disk magnet 84, the rotor 81 functions as a Lundell-type rotor of the magnetic field system.

Since the claw poles 82a and 83a are formed of iron, a direction that can be taken by a magnetic flux in this type of motor is free and is not restricted to a specific direction. Therefore, it is difficult to ensure an output of a motor by controlling the magnetic flux, that is, keeping leakage flux low only by a structural measure of the claw poles 82a and 83a in actuality. Thus, a measure to keep the leakage flux low by providing a magnet for rectifying a magnetic flux between the claw poles 82a and 83a can be considered, for example.

SUMMARY

However, since Japanese Laid-Open Utility Model Publication No. 5-43749 needs an additional magnet for rectifying a magnetic flux, it has a problem including an increase in the number of components, increase in the number of component assembling process and the like. Since this problem results in a cost increase of the motor, in a motor having this type of a Lundell-type rotor of a magnetic field system, there has been development needs for a technology that can ensure a motor output by generating a strong magnetic flux in claw poles with a simple structure.

Accordingly, it is an objective of this disclosure to provide a rotor and a motor that ensure a high output by generating a strong magnetic flux in claw poles with a small number of components.

In accordance with one aspect of the present disclosure, a rotor includes a first rotation member having a plurality of first claw poles in a circumferential direction and a second rotation member having a plurality of second claw poles in the circumferential direction. The first rotation member and the second rotation member are engaged with each other such that each second claw pole is fitted in a cutout portion between first claw poles and each first claw pole is fitted in a cutout portion between second claw poles. At least either one of the first rotation member and the second rotation member is formed of a magnet. The first claw poles and the second claw poles have north poles and south poles based on a magnetic field generated by the magnet. The north and south poles alternate in the circumferential direction.

According to this aspect, since it is only necessary to form at least either one of the first rotation member and the second rotation member as a magnet, a rotor 3 can be formed of a smaller number of components.

At least either one of the first rotation member and the second rotation member is formed of a magnet. At least either one of the first rotation member and the second rotation member is a member having a magnetic pole, and at least either one of claw poles of the first rotation member and the second rotation member has directivity of a magnetic flux. Thus, without preparing an additional magnet for rectifying a magnetic flux, north pole/south pole is generated by a strong magnetic flux at each claw pole. Consequently, the strong magnetic flux is generated at a claw pole with a small number of components, and a high output of the rotor is ensured.

In accordance with one aspect, the first rotation member and the second rotation member are each formed of a magnet, and the north poles and south poles are based on magnetic fields generated by the magnets.

According to this aspect, the first rotation member and the second rotation member are formed of magnets, respectively. Each of the first rotation member and the second rotation member is a member having a magnetic pole, respectively, and each of the claw poles of the first rotation member and the second rotation member has directivity of the magnetic flux. Thus, without preparing an Additional magnet for rectifying the magnetic flux, the magnetic poles are generated by a strong magnetic flux at each claw pole. Consequently, the strong magnetic flux is generated at a claw pole with a small number of components, and a high output of the rotor is ensured.

In accordance with one aspect, either one of the first rotation member and the second rotation member is formed of a soft magnetic material, the other is formed of a magnet. The soft magnetic material has a magnetic pole by the magnetic pole of the magnet.

According to this aspect, a soft magnetic material that is either one of the first rotation member and the second rotation member is magnetized by a magnetic force of the other magnet, whereby each of the first rotation member and the second rotation member functions as a north pole or a south pole. Thus, without using the magnet for rectifying a magnetic flux, a magnetic flux required for the first rotation member and the second rotation member can be formed. Therefore, the number of components of a Lundell-type rotor can be kept small. Since one of the first rotation member and the second rotation member is formed of a soft magnetic material, it is no longer necessary to form the both of a magnet, and component cost is effectively reduced.

In accordance with one aspect, the first rotation member and the second rotation member have shapes that are different from each other. That is, the size of the magnet can be changed in accordance with the strength of a magnet to be used, and as a result, the shapes of the first rotation member and the second rotation member are formed to be different from each other. Thus, the shape of the first rotation member or the second rotation member can be made optimal.

In accordance with one aspect, the first rotation member and the second rotation member have shapes that are the same. According to this aspect, since the balance (weight balance) of the rotor is improved, functionality is effectively ensured.

In accordance with one aspect, the magnet is an anisotropic magnet, which is magnetized in a specific direction. According to this aspect, since at least either one of the first rotation member and the second rotation member is formed of anisotropic magnet, effect of generating a strong magnetic flux directed in a specific direction at each claw pole is improved. Thus, torque of the rotor is effectively ensured.

In accordance with one aspect, the rotor is configured to be attached to a shaft. The rotor further has a plate-shaped soft magnetic material, which is attached and fixed to the shaft and is located between the first rotation member and the second rotation member. The soft magnetic material is configured as a positioning member, which determines the positions of the first rotation member and the second rotation member. According to this aspect, the soft magnetic material is firmly assembled to the shaft by press-fit fixation or the like, for example. Since the first rotation member and the second rotation member made of magnet is attracted to this soft magnetic material by a magnetic force, the positions of the first rotation member and the second rotation member are determined with respect to the shaft. Thus, an equiangular arrangement, that is, an even arrangement in a circumferential direction of the claw pole is ensured, and an effect of ensuring a desired output of the rotor is improved.

In accordance with one aspect, the soft magnetic material is soft iron, metal glass, Permendur or amorphous. According to this aspect, since the soft magnetic material can be formed of a material with high rigidity, the soft magnetic material is fixed to the shaft more firmly. Thus, neither the first rotation member nor the second rotation member fixed to the soft magnetic material by the magnetic force can shift easily with respect to the shaft.

In accordance with one aspect, the soft magnetic material is not provided between the first rotation member and the second rotation member. The first rotation member and the second rotation member are directly attached to the shaft. According to this aspect, since the number of components is reduced by not using the soft magnetic material, the size of the rotor is reduced.

In accordance with one aspect, the magnet is a sintered magnet or a bond magnet. According to this aspect, the first rotation member and the second rotation member can be manufactured by either compression molding or injection molding. Therefore, the manufacturing method is not limited to one.

In accordance with one aspect, the magnet is a ferrite magnet, a samarium cobalt magnet, a samarium iron nitride magnet, a neodymium magnet or an alnico magnet. According to this aspect, the first rotation member and the second rotation member can be manufactured also with these general-purpose materials.

In accordance with one aspect, the rotor has a tandem structure in which a plurality of rotor units, each being composed of sets of the first rotation member and the second rotation member, are laminated in an axial direction such that poles of the same polarity contact each other. According to this aspect, since the area of the north pole and the area of the south pole formed by each claw pole on an outer peripheral surface of the rotor can be made larger, the torque is effectively improved.

In accordance with one aspect, the first rotation members and the second rotation members of the rotor units are formed such that a member located outside in the axial direction and a member located inside in the axial direction have the same magnetic polarity. According to this aspect, since a passage for the magnetic flux can be formed wide at a spot where the two rotor units contact each other, the torque is effectively improved.

In accordance with one aspect, among the first rotation members and the second rotation members in the rotor units, two members that have the same polarity and contact each other inside in the axial direction are integrated. According to this aspect, in a plurality of the rotor units, since the two members of the same polarity are integrated, a member that is originally assumed to have two components has only one component. Thus, the number of components required for the rotor is kept small.

In accordance with one aspect, a motor is provided that includes the above described rotor and a stator rotationally supporting the rotor.

Other aspects and advantages of the discloser will become apparent from the following description, taken in conjunction with the accompanying drawings, illustrating by way of example the principles of the disclosure.

BRIEF DESCRIPTION OF THE DRAWINGS

The features of the present disclosure that are believed to be novel are set forth with particularity in the appended claims. The disclosure, together with objects and advantages thereof, may best be understood by reference to the following description of the presently preferred embodiments together with the accompanying drawings in which:

DETAILED DESCRIPTION OF THE PREFERRED EMBODIMENTS (First Embodiment)

FIGS. 1 to 5 illustrate a rotor and a motor according to a first embodiment of the present disclosure.

Figure 1:
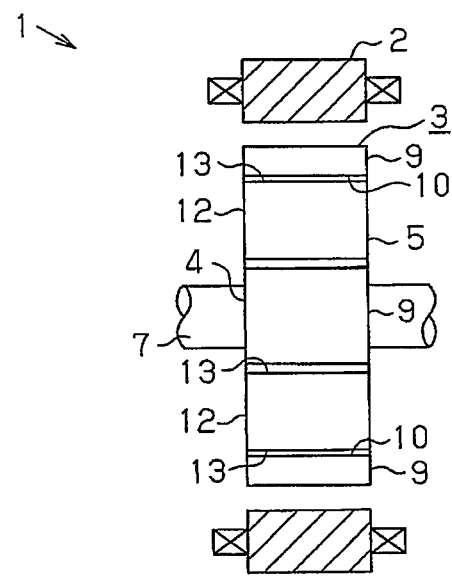
FIG. 1 is a configuration diagram of a motor of a first embodiment.

As illustrated in FIG. 1, a motor 1 has a stator 2 as a fixed portion of the motor 1. Inside the stator 2, a rotor 3 as a rotating portion of the motor 1 is provided rotationally with respect to the stator 2. When an electric current flows through a coil wound around an iron core of the stator 2, the rotor 3 rotates with respect to the stator 2 by a magnetic field generated as a magnetic field system, that is, a permanent magnetic field system between the stator 2 and the rotor 3.

Figure 2:
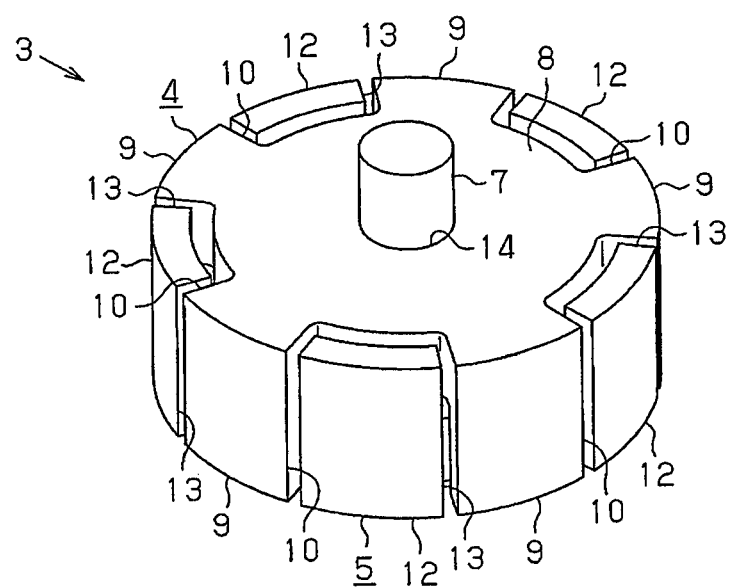
FIG. 2 is a perspective view illustrating the appearance of the rotor in FIG. 1.
Figure 3:
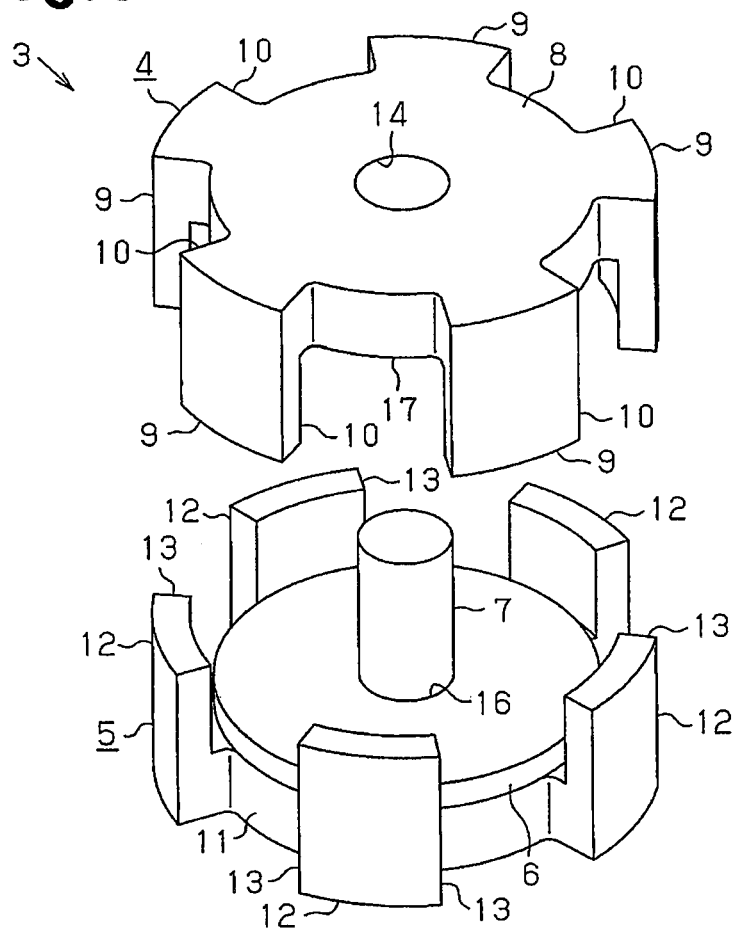
FIG. 3 is an exploded perspective view illustrating the component configuration of the rotor in FIG. 2.

As illustrated in FIGS. 2 and 3, a Lundell-type rotor 3 of a magnetic field system as in this example is provided with a pair of rotation members 4 and 5 made of a permanent magnet, for example, and a plate-shaped soft magnetic material 6 sandwiched between the pair of these rotation members 4 and 5. The motor 1 in this example has a single-layer structure composed of the two rotation members 4 and 5. In the case of this example, the rotation member located in an upper part in FIGS. 2 and 3 is referred to as the first rotation member 4, while the rotation member located in a lower part is referred to as the second rotation member 5. At the center of the rotor 3, a non-magnetic shaft 7, which is a rotary shaft of the rotor 3, is attached.

On a peripheral edge of a substantially disk-shaped first rotation body 8 provided in the first rotation member 4, a plurality of first claw poles 9 arranged in the circumferential direction at equal intervals are projected radially outward. Moreover, the first claw poles 9 of the first rotation member 4 have a shape extending in a motor axial direction, that is, a shape protruding in an axial direction or downward, for example, in FIGS. 2 and 3. A gap between adjacent first claw poles 9 is a cutout portion 10. The second rotation member 5 has substantially the same shape as that of the first rotation member 4 and has a second rotation body 11, a plurality of second claw poles 12, and a plurality of cutout portions 13 similarly to the first rotation member 4. The first rotation member 4 and the second rotation member 5 are assembled to be vertically opposite to each other so that each claw pole 9 (12) of one of the first and second rotation members 4, 5 fits in a cutout portion 13 (10) of the other, and the opposite magnetic poles contact each other. As a result, the first claw poles 9 of the first rotation member 4 and the second claw poles 12 of the second rotation member 5 are alternately arranged in the rotor circumferential direction. At the center of each of the rotation members 4 and 5, through holes 14 and 15 are provided to extend through the shaft 7, respectively.

The claw poles 9 and 12 are formed, each having a rectangular shape, when seen from a rotor radial direction. The claw poles 9 and 12 may be formed, each having a regular square shape or a trapezoidal shape, for example. A gap between the rotation body 8 of the first rotation member 4 and the second claw pole 12 and a gap between the rotation body 11 of the second rotation member 5 and the first claw pole 9 are formed so that a perpendicular section in the radial direction has a rectangular shape. Moreover, a gap between adjacent claw poles 9 and 12 is separated to form a rectangular space when seen from the rotor radial direction.

The first rotation member 4 and the second rotation member 5 of the first embodiment are composed of an anisotropic magnet, that is, a polar anisotropic magnet. The anisotropic magnet is a magnet magnetized in a specific direction and has a strong magnetic force in the specific direction. As the anisotropic magnet, a sintered magnet, a bonded magnet (plastic magnet, rubber magnet and the like) and the like are used, for example. Other examples such as a ferrite magnet, a samarium iron nitride (Sm—Fe—N) magnet, a samarium cobalt magnet, a neodymium magnet, an alnico magnet and the like may be used as the anisotropic magnet.

The soft magnetic material 6 has a disk shape and is composed of any one of soft iron, metal glass, Permendur, and amorphous, for example. At the center of the soft magnetic material 6, a through hole 16, through which the shaft 7 is inserted, is provided, and the shaft 7 is press-fitted and fixed to the soft magnetic material 6. That is, the soft magnetic material 6 is firmly fixed to the shaft 7 by press-fit fixation. Since the rotation members 4 and 5 are attracted to the soft magnetic material 6 as a positioning member by a magnetic force, the rotation members 4 and 5 are fixed to the shaft 7 with their positions determined. As a result, the rotation members 4 and 5 are positioned with respect to the shaft 7.

Figure 4:
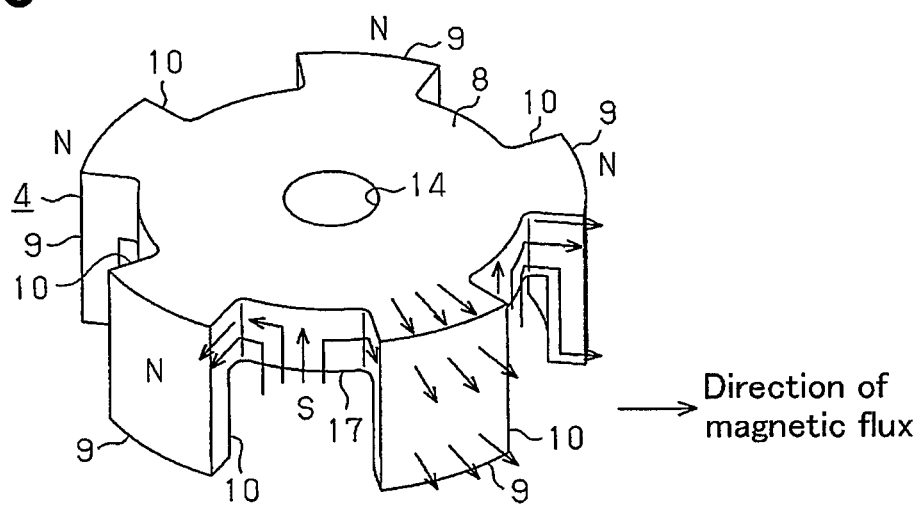
FIG. 4 is an explanatory perspective view showing a magnetic field generated in the first rotation member in FIG. 3.
Figure 5:
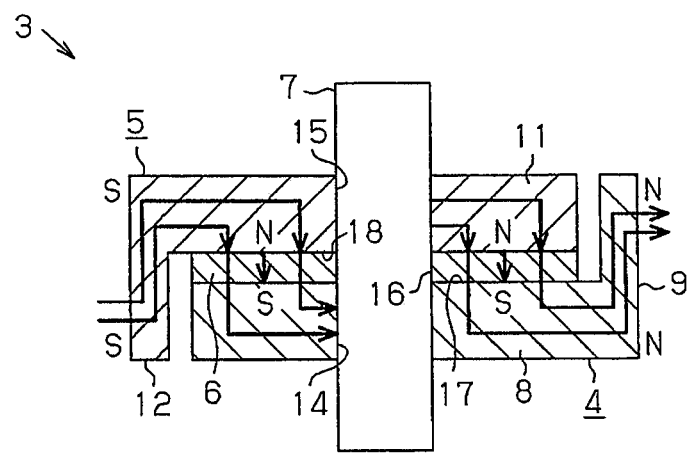
FIG. 5 is an explanatory cross-sectional view showing a magnetic field generated in the first rotation member and the second rotation member in FIG. 2.

As illustrated in FIGS. 4 and 5, the first rotation member 4 is magnetized so that a magnetic moment is directed in a direction of the first claw pole 9 from an inner surface 17 of the first rotation body 8 directed to the second rotation member 5. Thus, in the first rotation member 4, an outer peripheral surface of each first claw pole 9 is a north pole. That is, the first rotation member 4 has an outer-peripheral north pole. The inner surface 17 of the first rotation body 8, that is, a perpendicular face in the axial direction is a south pole. That is, the first rotation member 4 has an axial perpendicular south pole. As illustrated in FIG. 5, the second rotation member 5 is magnetized so that the magnetic moment is directed in a direction of an inner surface 18 of the second rotation body 11 directed to the first rotation member 4 from the second claw pole 12. Thus, in the second rotation member 5, an outer peripheral surface of each second claw pole 12 is a south pole. That is, the second rotation member 5 has an outer-peripheral south pole. An inner surface 18 of the second rotation body 11, that is, an axial perpendicular face is a north pole. That is, the second rotation member 5 has an axial perpendicular north pole.

Thus, when the first rotation member 4 and the second rotation member 5 are assembled to each other, each north claw pole 9 of the first rotation member 4 fits in a cutout portion 13 of the second rotation member 5, and each south claw pole 12 of the second rotation member 5 fits in a cutout portion 10 of the first rotation member 4. Thus, in the circumferential direction of the rotor 3, the north poles and south poles are arranged alternately, and the rotor 3 functions as the Lundell-type rotor of magnetic field system.

Operation of the motor 1 in this example will now be described by using FIGS. 4 and 5.

As illustrated in FIGS. 4 and 5, the first rotation member 4 and the second rotation member 5 are formed not of iron but of a permanent magnet. The first rotation member 4 is magnetized to have an outer-peripheral N-pole, while the second rotation member 5 is magnetized to have an outer-peripheral S-pole. Thus, as illustrated in FIG. 5, a magnetic flux path from the outer-peripheral south pole of the second rotation member 5 toward the axial perpendicular north pole and further passing through the soft magnetic material 6 and going from the axial perpendicular south pole of the first rotation member 4 to the outer-peripheral north pole is formed. As a result, when the electricity is supplied to the stator 2, the rotor 3 is made rotational with respect to the stator 2.

As described above, in the first embodiment, since the first rotation member 4 and the second rotation member 5 are formed of a magnet, that is, an anisotropic magnet, respectively, each of the first rotation member 4 and the second rotation member 5 has its own magnetic poles. Thus, each of the claw poles 9 and 12 of each of the rotation members 4 and 5 has its own directivity of the magnetic flux, and strength of the magnetic flux to be generated in the claw poles 9 and 12 is ensured. Therefore, even without an additional magnet for rectifying a magnetic flux, the north pole and the south pole can be generated with a strong magnetic flux in each of the claw poles 9 and 12. As a result, the strong magnetic flux is generated in the claw poles 9 and 12 with a smaller number of components, and a high output of the rotor 3, that is, of the motor 1 is ensured.

It can be assumed that the first rotation member 4 and the second rotation member 5 are directly fixed to the shaft 7 without using the soft magnetic material 6, for example. However, if the first rotation member 4 and the second rotation member 5 are formed by a sintered magnet or a bond magnet and directly fixed to the shaft 7, the sintered magnet or the bond magnet might be split or loosened. That is, bonding between the rotation members 4 and 5 and the shaft 7 cannot be ensured easily. If the assembling of the first rotation member 4 and the second rotation member 5 to the shaft 7 is loose, the first rotation member 4 and the second rotation member 5 might shift in the circumferential direction with respect to the shaft 7, and the equiangular arrangement, that is, the even arrangement of the first rotation member 4 and the second rotation member 5 in the rotor circumferential direction might be lost. If the equiangular arrangement is lost, a non-uniform magnetic flux is generated from the rotor 3, causing difficulty obtaining a desired output.

Accordingly, in the first embodiment, the soft magnetic material 6 is provided between the first rotation member 4 and the second rotation member 5, and the soft magnetic material 6 is firmly assembled and fixed to the shaft 7 by press-fit fixation and the like. Then, by firmly attracting the first rotation member 4 and the second rotation member 5 to the soft magnetic material 6 with a magnetic force of the magnet, the positions of the first rotation member 4 and the second rotation member 5 are determined with respect to the shaft 7. Since it is difficult for the first rotation member 4 and the second rotation member 5 to move in the circumferential direction with respect to the shaft 7, the equiangular arrangement, that is, the even arrangement of the first rotation member 4 and the second rotation member 5 in the circumferential direction is ensured. As a result, a desired output for the rotor 3 is effectively ensured.

The configuration of the first embodiment achieves the advantages described below.

(1) The first rotation member 4 and the second rotation member 5 are formed of a magnet, that is, an anisotropic magnet. Therefore, each of the claw poles 9 and 12 of the first rotation member 4 and the second rotation member 5 can have directivity of the magnetic flux and thus, an additional magnet for rectifying a magnetic flux is not necessary. Thus, a strong magnetic flux is generated in the claw poles 9 and 12 with a smaller number of components, and a high output of the motor 1 having the rotor 3 is ensured. The structure of the first embodiment is also advantageous in a multi-polar structure of the rotor 3.

(2) Since the first rotation member 4 and the second rotation member 5 are formed of the anisotropic magnet, a strong magnetic flux directed in a specific direction, that is, from the north pole to the south pole inside each of the claw poles 9 and 12 is effectively generated. Thus, the torque of the rotor 3, that is, of the motor 1 is effectively ensured.

(3) The soft magnetic material 6, which is firmly fixed to the shaft 7 by press-fit fixation and the like, is provided between the first rotation member 4 and the second rotation member 5. By attracting the first rotation member 4 and the second rotation member 5 made of a magnet to this soft magnetic material 6 by a magnetic force, the positions of the first rotation member 4 and the second rotation member 5 are determined in the circumferential direction with respect to the shaft 7. Thus, the equiangular arrangement, that is, even arrangement of the claw poles 9 and 12 in the rotor circumferential direction is ensured, and the desired output of the rotor 3, that is, the motor 1 is effectively ensured.

(4) If the first rotation member 4 and the second rotation member 5 are made of a sintered magnet or a bonding magnet, the first rotation member 4 and the second rotation member 5 can be formed by either of compression molding or injection molding, for example. Therefore, the manufacturing method of the first rotation member 4 and the second rotation member 5 is not limited to one.

(5) The first rotation member 4 and the second rotation member 5 can be formed also of a ferrite magnet, a samarium cobalt magnet, a samarium iron nitride magnet, a neodymium magnet or an alnico magnet. Therefore, the first rotation member 4 and the second rotation member 5 can be manufactured also with these general-purpose materials.

(6) If the soft magnetic material 6 is formed of a material with high rigidity such as soft iron, metal glass, Permendur, amorphous and the like, the soft magnetic material 6 is fixed to the shaft 7 more firmly. Thus, the first rotation member 4 and the second rotation member 5 attracted to the soft magnetic material 6 by a magnetic force do not easily shift in the rotor circumferential direction with respect to the shaft 7.

(7) The outer peripheral surfaces of the first rotation member 4 and the second rotation member 5 have one magnetic pole of the north pole and the south pole, and the axial perpendicular face of the first rotation body 8 and the second rotation body 11 has the other magnetic pole. Thus, the magnetic material for generating a magnetic flux in the first rotation member 4 and the second rotation member 5 can be arranged to the center part in the rotor radial direction of the first rotation member 4 and the second rotation member 5. Consequently, particles of the magnetic material increase and a magnetic flux amount are increased.

(Second Embodiment)

Figure 6:
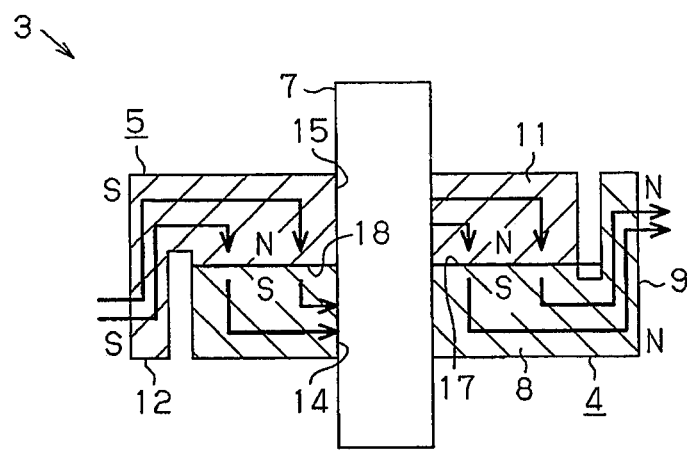
FIG. 6 is an explanatory cross-sectional view showing the magnetic field generated in a rotor in a second embodiment.

FIG. 6 illustrates a second embodiment. The second embodiment is a configuration in which the soft magnetic material 6 described in the first embodiment is omitted, and the other basic configurations are the same as those of the first embodiment. Thus, the same portions as those in the first embodiment are given the same reference numerals and detailed description will be omitted, while only differences will be described in detail.

As illustrated in FIG. 6, in the rotor 3 in the second embodiment, the soft magnetic material 6 is omitted, and the rotor 3 has a structure in which the first rotation member 4 and the second rotation member 5 are directly brought into contact with each other. In this case, the first rotation member 4 and the second rotation member 5 are attached and fixed to the shaft 7 by adhesion or the like, for example. If the soft magnetic material 6 is omitted from the rotor 3, the number of components in the rotor 3 is reduced by that portion. Thus, with the configuration of the second embodiment, a component cost and the size of the rotor 3 is effectively reduced.

According to the configuration of the second embodiment, in addition to (1) to (7) described in the first embodiment, the advantage described below is achieved.

(8) Since the number of components is reduced by omitting the soft magnetic material 6, the size of the rotor 3 is effectively reduced.

(Third Embodiment)

FIGS. 7 to 11 illustrate a third embodiment. The third embodiment is different from the first and second embodiments in a point that the rotor 3 has a tandem structure, that is, a layered structure, but the other basic configurations are the same as those in the first and second embodiments. Thus, only the differences of the third embodiment will be described in detail.

Figure 7:
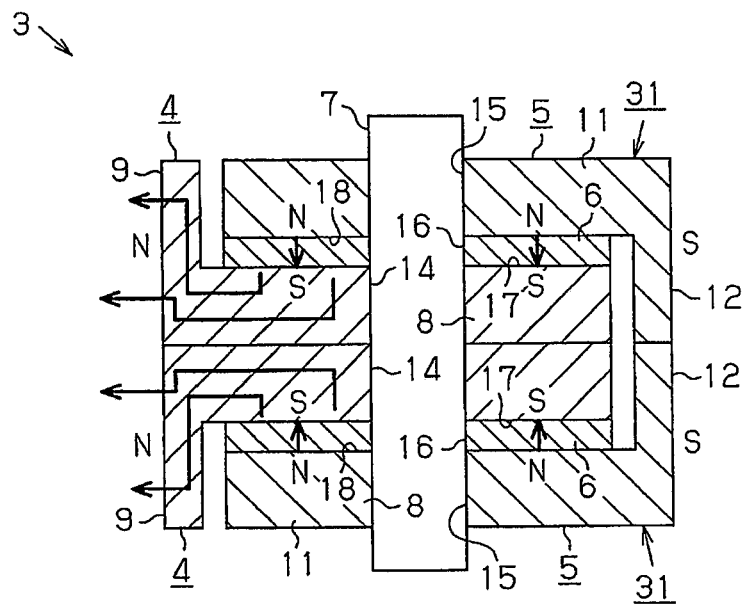
FIG. 7 is an explanatory cross-sectional view showing the magnetic field generated in a rotor in a third embodiment.

As illustrated in FIG. 7, the rotor 3 of the tandem structure is composed of a plurality of (two in this case) rotor units 31. The rotor unit 31 in the third embodiment is the same as the rotor 3 described in the first embodiment. In the case of the tandem structure, these rotor units 31 are arranged vertically opposite to each other in the axial direction of the rotor 3 and attached so that the north poles (or the south poles) contact each other. In FIG. 7, the first rotation members 4 contact each other.

In the case of the third embodiment, since the rotor units 31 are provided, the north poles and the south poles having larger areas on the outer peripheral surface of the rotor 3 are formed. Thus, the torque of the rotor 3 can be set high, and the motor 1 with a high output is provided.

Figure 8:
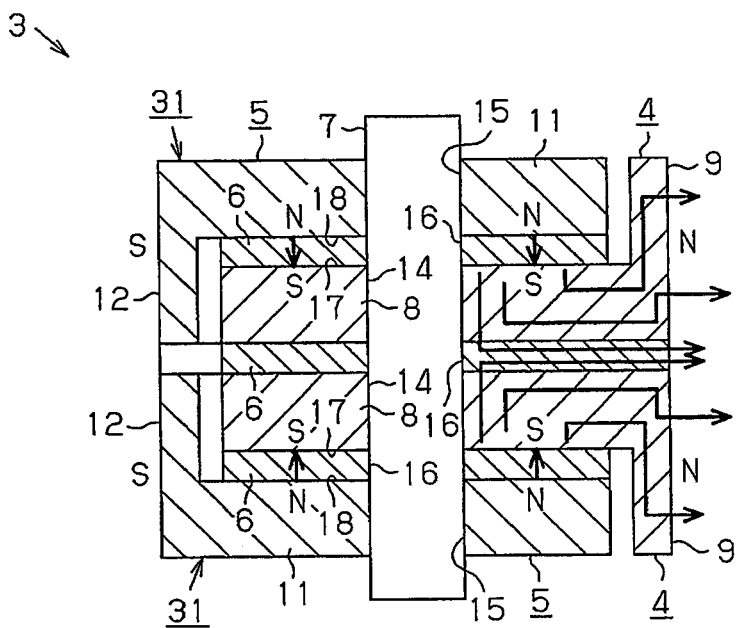
FIG. 8 is an explanatory cross-sectional view showing the magnetic field generated in a rotor in a modification.
Figure 9:
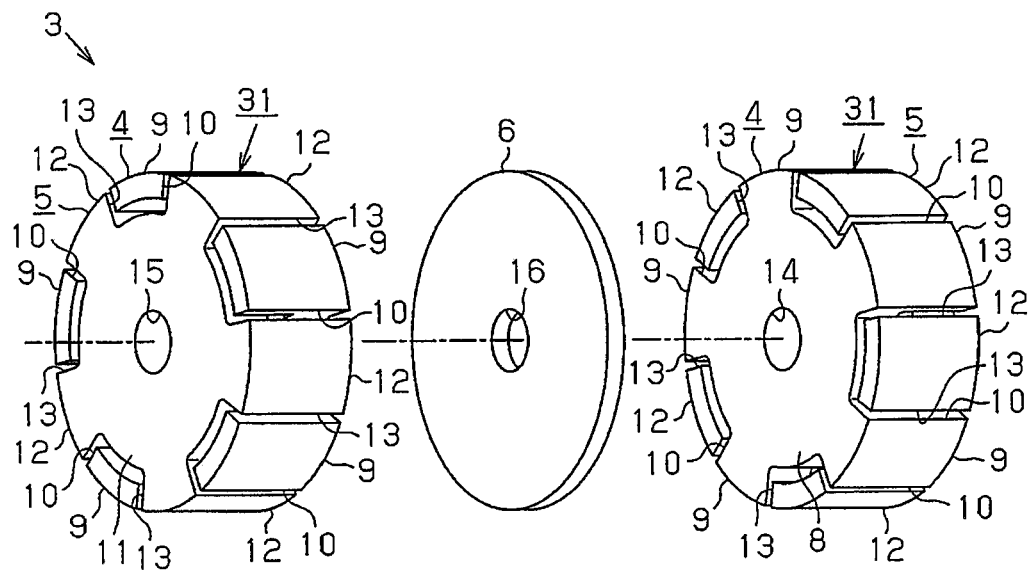
FIG. 9 is an exploded perspective view illustrating a configuration of the rotor in a modification.
Figure 10:
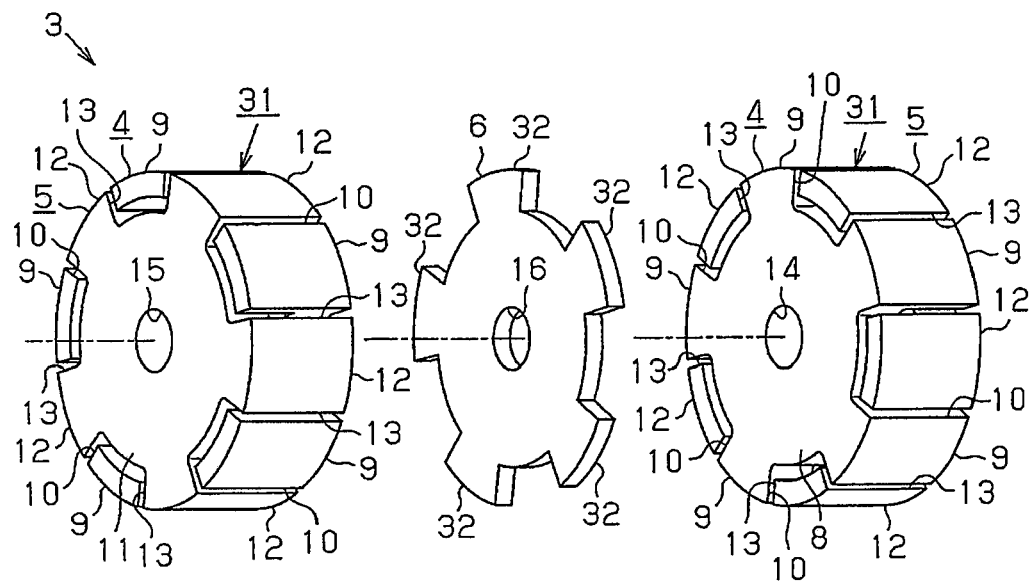
FIG. 10 is an exploded perspective view illustrating the configuration of the rotor in a modification.

In the case of the tandem structure, as illustrated in FIG. 8, the third soft magnetic material 6 may be arranged between the two rotor units 31. The third soft magnetic material 6 may have a disk-plate shape as illustrated in FIG. 9 or may have a shape having a plurality of teeth 32 as illustrated in FIG. 10. FIG. 8 illustrates the third soft magnetic material 6 between the rotor units 31 in FIG. 10. If the third soft magnetic material 6 has a shape having the teeth 32, these teeth 32 are formed at equal intervals in the circumferential direction in accordance with the first claw poles 9, which are magnetic poles of one of magnetic poles of each rotor unit 31.

Figure 11:
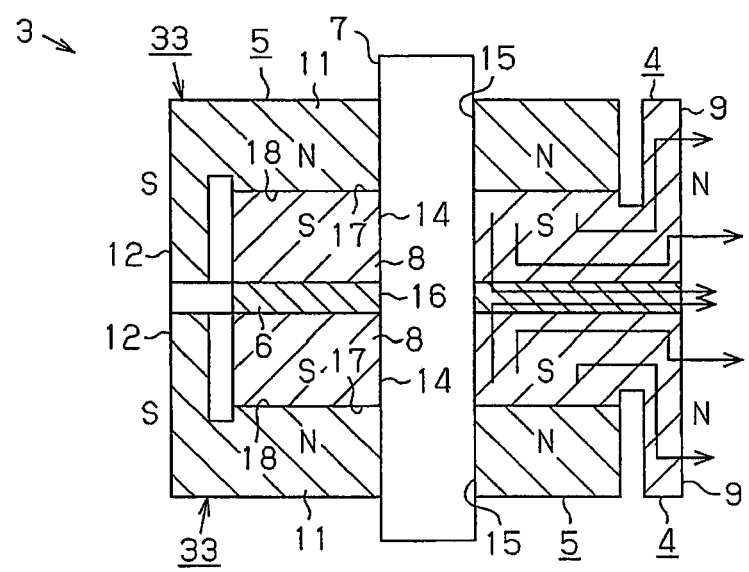
FIG. 11 is an explanatory cross-sectional view showing a magnetic field generated in the rotor in a modification.

As illustrated in FIG. 11, the rotor 3 in the third embodiment may use a plurality of rotor units 33, each not having the soft magnetic material 6 therein described in the second embodiment. In this case, by providing the soft magnetic material 6 between the two rotor units 33, each not having the soft magnetic material 6, the positions of the rotor units 33 and 33 are reliably determined with respect to the shaft 7.

With the configuration of the third embodiment, in addition to (1) to (8) described in the first and second embodiments, the advantages described below are achieved.

(9) Since the area of the north poles and the area of the south poles on the outer peripheral surface of the rotor 3 are made larger, the torque is effectively improved. A magnetic flux amount passing through the rotor 3 increases, which also contributes to improvement of the torque.

The embodiment is not limited to the above-described configurations but may be changed to the following forms.

In the third embodiment, the number of the rotor units 31 and 33 is not limited to 2, but may be three or more.

In the tandem structure in FIG. 7, the two first rotation members 4 with the same polarity and in contact with each other may be integrally formed. Alternatively, by bringing the second rotation members 5 into contact with each other, the two second rotation members 5 may be integrated.

In the first to third embodiments, the soft magnetic material 6 and the shaft 7 may be a single member formed integrally.

In the first to third embodiments, the number of claw poles 9 and 12 is not limited to the number described in the embodiments but may be changed to another number.

In the first to third embodiments, the direction of the magnetic moment formed in the first rotation member 4 or the second rotation member 5 may be changed as appropriate.

In the first to third embodiments, the materials of the rotation members 4 and 5 and the soft magnetic material 6 may be changed as appropriate to those other than the materials described in the embodiments.

In the first to third embodiments, the shapes of the rotation members 4 and 5 and the soft magnetic material 6 are not limited to the shapes described in the above-described embodiments but may be changed as appropriate to other shapes.

(Fourth Embodiment)

FIGS. 12 to 17 illustrate a motor and a motor according to a fourth embodiment.

Figure 12:
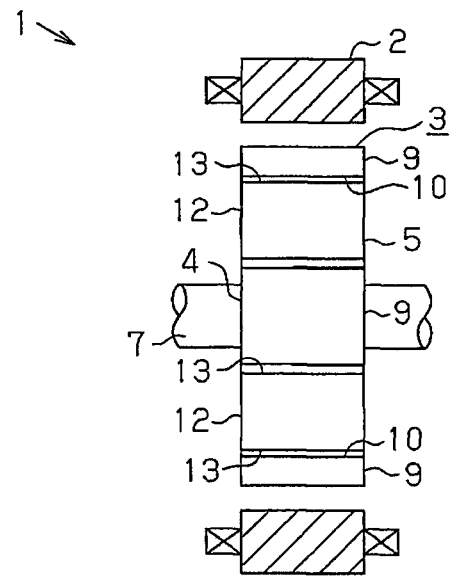
FIG. 12 is a configuration diagram of a motor in a fourth embodiment.

As illustrated in FIG. 12, in a motor 1, a stator 2, which is a fixed portion of the motor 1, is provided. Inside the stator 2, a rotor 3 as a rotating portion of the motor 1 is provided rotationally with respect to the stator 2. When an electric current flows through a coil wound around an iron core of the stator 2, the rotor 3 rotates with respect to the stator 2 by a magnetic field generated at a magnetic field system, that is, a permanent magnetic field system between the stator 2 and the rotor 3.

Figure 13:
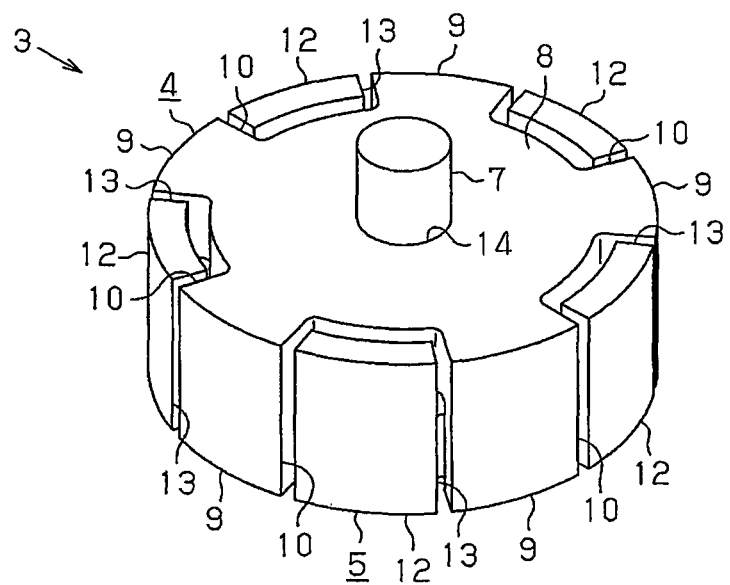
FIG. 13 is a perspective view illustrating the appearance of the rotor in FIG. 12.
Figure 14:
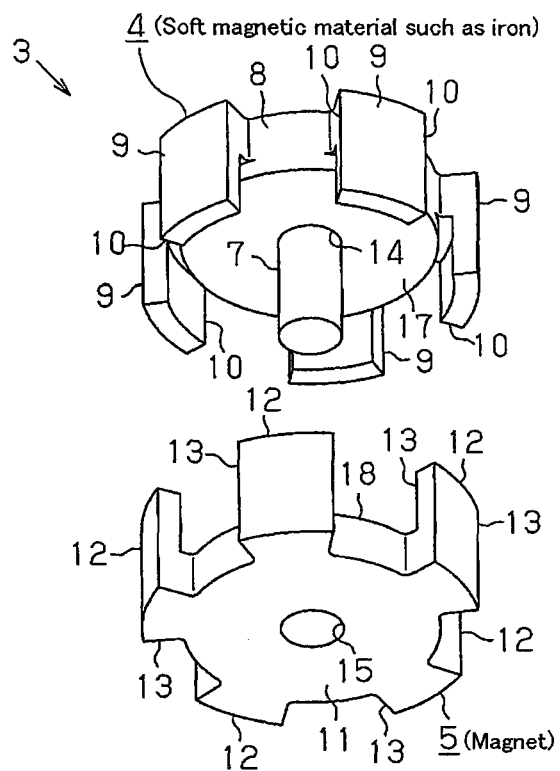
FIG. 14 is an exploded perspective view illustrating the component configuration of the rotor in FIG. 13.

As illustrated in FIGS. 13 and 14, a Lundell-type rotor 3 of a magnetic field system as in this example is provided with a pair of rotation members 4 and 5 and they are assembled integrally. The motor 1 in the fourth embodiment has a single-layer structure composed of the two rotation members 4 and 5. In the fourth embodiment, rotation member located in an upper part in FIG. 13 is referred to as the first rotation member 4, while the rotation member located in a lower part is referred to as the second rotation member 5. At the shaft center of the rotor 3, the non-magnetic shaft 7, which is a rotary shaft of the rotor 3, is attached.

The second rotation member 5 is composed of an anisotropic magnet, that is, a polar anisotropic magnet. The anisotropic magnet is a magnet magnetized in a specific direction and has a strong magnetic force in the specific direction. As the anisotropic magnet, a sintered magnet, a bond magnet (plastic magnet, rubber magnet and the like) and the like are used, for example. Other than these magnets, a ferrite magnet, a samarium iron nitride (Sm—Fe—N) magnet, a samarium cobalt magnet, a neodymium magnet, an alnico magnet and the like may be used, for example. In FIGS. 16 to 23, the magnet is hatched by a black-dot pattern.

Figure 15:
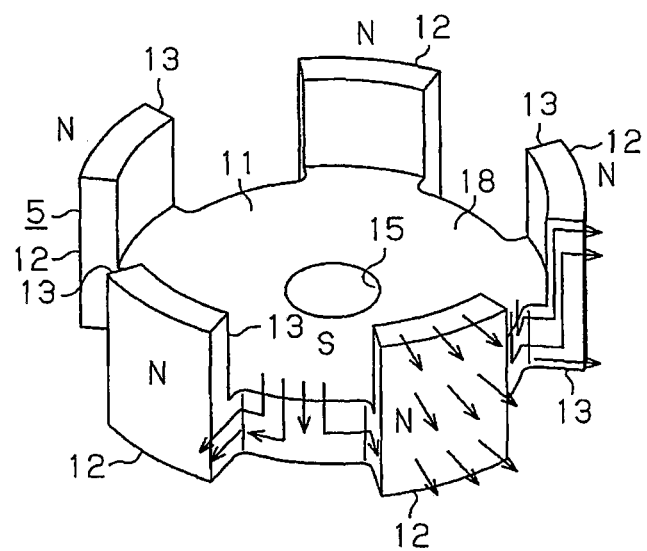
FIG. 15 is a perspective view illustrating the magnetic field generated in the second rotation member made of the magnet illustrated in FIG. 14.
Figure 16:
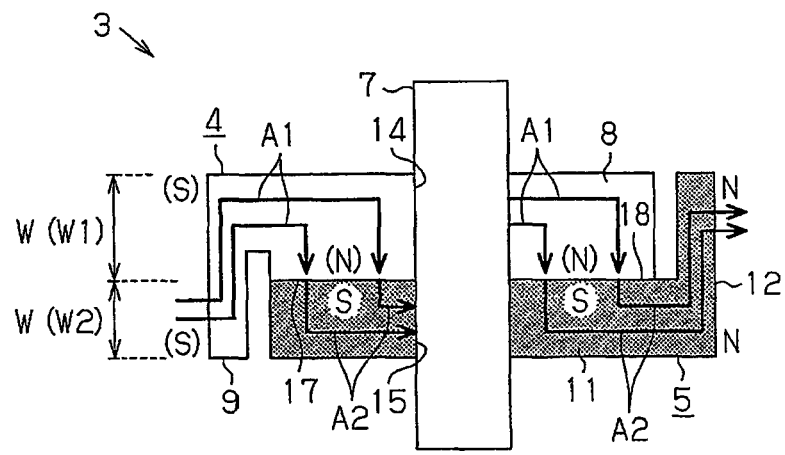
FIG. 16 is an exemplifying cross-sectional view illustrating the magnetic field generated in the first rotation member and the second rotation member in FIG. 13.

As illustrated in FIGS. 15 and 16, the second rotation member 5 made of a magnet is magnetized so that a magnetic moment is directed in a direction of the second claw pole 12 from an inner surface 18 of the second rotation body 11 directed to the first rotation member 4. Thus, in the second rotation member 5, an outer peripheral surface of each second claw pole 12 is the north pole, that is, the outer-peripheral north pole, while the inner surface 18 of the second rotation body 11, that is, an axial perpendicular face is the south pole, that is, the axial perpendicular south pole.

The first rotation member 4 is formed by a soft magnetic material. The used soft magnetic material is iron, for example. In a state where the first rotation member 4 of the fourth embodiment is assembled to the second rotation member 5, a magnetic pole is formed by the magnetic force of the second rotation member 5. Thus, the first rotation member 4 is magnetized so that the magnetic moment is directed in a direction of the inner surface 18 of the first rotation body 8 from the first claw pole 9. Thus, the outer peripheral surface of each claw pole 9 of the first rotation member 4 is caused to be the south pole, that is, the outer-peripheral south pole, while the inner surface 17 of the first rotation body 8, that is, the axial perpendicular face is caused to be the north pole, that is, the axial perpendicular north pole.

The first rotation member 4 is formed of a soft magnetic material and is assembled and fixed to the shaft 7 by press-fit fixation or the like. The second rotation member 5 is assembled to the first rotation member 4 and the shaft 7 by being attracted to the first rotation member 4 by the magnetic force. Thus, the equiangular arrangement, that is, the even arrangement in the circumferential direction of the first rotation member 4 with respect to the shaft 7 is ensured by the press-fit fixation, and the equiangular arrangement. That is, the even arrangement in the circumferential direction of the second rotation member 5 with respect to the shaft 7 is ensured by being attracted by the magnetic force.

As illustrated in FIG. 16, the first rotation member 4 and the second rotation member 5 are formed to have shapes different from each other. In the case of the fourth embodiment, the first rotation member 4 and the second rotation member 5 are formed to have the thicknesses of the rotation bodies 8 and 11 different from each other. The thickness of the first rotation body 8 is W1, the thickness of the second rotation body 11 is W2, and W2<W1. As in the fourth embodiment, in order to form the second rotation member 5 thinner than the first rotation member 4, the second rotation member 5 is formed of a material with a strong magnetic force, for example, so that the thickness W2 can be made thin. As described above, the shapes of the first rotation member 4 and the second rotation member 5 are different from each other as a result.

The first rotation member 4 and the second rotation member 5 are arranged so that each north pole first claw pole 9 of the first rotation member 4 fits in a cutout portion 13 of the second rotation member 5, while each south pole second claw pole 12 of the second rotation member 5 fits in a cutout portion 10 of the first rotation member 4. In the circumferential direction of the rotor 3, the north poles and south poles are arranged alternately, and the rotor 3 functions as the Lundell-type rotor of magnetic field system.

Operation of the motor 1 of the fourth embodiment will be now described by using FIGS. 14 to 16.

As illustrated in FIGS. 14 to 16, by forming the first rotation member 4 not of a magnet but of a soft magnetic material such as iron and by forming the second rotation member 5 of a magnet, that is, an anisotropic magnet, and by using the magnetic force of the second rotation member 5 made of a magnet, a magnetic field required for the first rotation member 4 is generated. In the fourth embodiment, when the second rotation member 5 is formed of an outer-peripheral north pole magnet, the first rotation member 4 made of a soft magnetic material is magnetized to the outer-peripheral south pole by the magnetic force of the second rotation member 5.

Thus, as illustrated in FIG. 16, in the first rotation member 4, a magnetic moment in the illustrated arrow A1 direction is formed by the magnetic force of the second rotation member 5 made of a magnet of the outer-peripheral north pole magnet. In the second rotation member 5, a magnetic moment in the illustrated arrow A2 direction is generated by its own magnetic force. Thus, the first claw pole 9 of the first rotation member 4 is the south pole, while the second claw pole 12 of the second rotation member 5 is the north pole, and thereby, the claw poles 9 and 12 arranged in the circumferential direction of the rotor 3 take the north pole and the south pole alternately, and the rotor 3 has a consequent pole structure. As a result, when electricity flows through the stator 2, the rotor 3 is made rotational with respect to the stator 2.

As described above, in the fourth embodiment, by forming the first rotation member 4 of the soft magnetic material in order to reduce the quantity of the magnet and by magnetizing the first rotation member 4 by using the magnetic force of the second rotation member 5 made of a magnet, a magnetic moment required as a part of the rotor 3 is generated in the first rotation member 4. Thus, without using an additional magnet for rectifying a magnetic flux, a required magnetic flux can be generated in each of the claw poles 9 and 12. Therefore, the Lundell-type rotor 3 can be formed of a smaller number of components. Moreover, since it is only necessary that only either one of the first rotation member 4 and the second rotation member 5 is made of a magnet, the number of required magnet components decreases, and the component cost is effectively reduced.

In the case of the fourth embodiment, by firmly assembling the first rotation member 4 made of a soft magnetic material to the non-magnetic shaft 7 by press-fit fixation and the like and by attracting the second rotation member 5 to the first rotation member 4 by its own magnetic force, the first rotation member 4 and the second rotation member 5 are fixed to the shaft 7 with their positions determined. Thus, since the first rotation member 4 and the second rotation member 5 are difficult to move in the circumferential direction with respect to the shaft 7, the equiangular arrangement, that is, the even arrangement of the first rotation member 4 and the second rotation member 5 in the circumferential direction is ensured. As a result, the desired output of the rotor 3 is effectively ensured.

Figure 17:
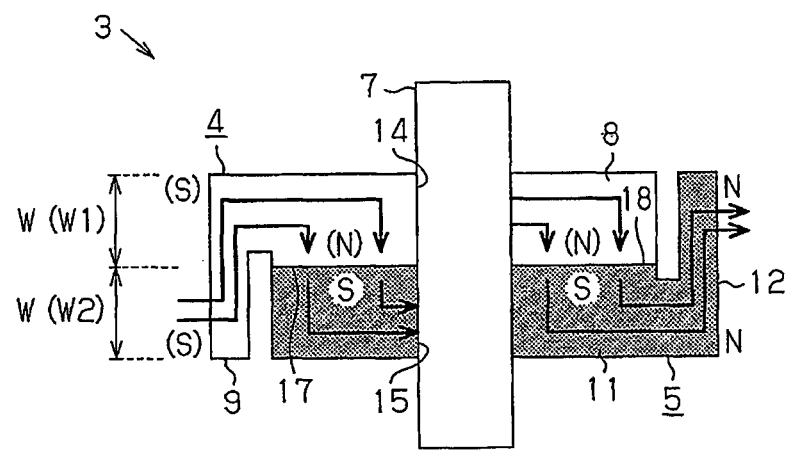
FIG. 17 is an exemplifying cross-sectional view illustrating the magnetic field generated in the rotor in a modification.

The thickness W1 of the first rotation member 4 and the thickness W2 of the second rotation member 5 do not necessarily have to be different from each other. As illustrated in FIG. 17, the first rotation member 4 and the second rotation member 5 may be formed so that the thicknesses W1 and W2 are the same as each other. In this case, since a weight balance in the axial direction of the rotor 3 is improved, functionality as the rotor 3 is effectively ensured.

According to the configuration of the fourth embodiment, the advantages described below are achieved.

(11) By magnetizing the first rotation member 4 made of a soft magnetic material by the magnetic force of the second rotation member 5 made of a magnet, the magnetic moment is generated in the first rotation member 4. Thus, the inner surface 17 of the first rotation member 4 and the inner surface 18 of the second rotation member 5 function as a north pole and a south pole, respectively. Accordingly, without using an additional magnet for rectifying a magnetic flux, a magnetic field required for the first rotation member 4 and the second rotation member 5 are formed. Therefore, the number of components of the Lundell-type rotor 3 is kept small. Since the first rotation member 4 is formed of a soft magnetic material, it is no longer necessary to form both the first rotation member 4 and the second rotation member 5 of a magnet, and a component cost is effectively reduced.

(12) The size of the second rotation member 5, which is a magnet, can be changed in accordance with the type of the magnet in use, that is, the strength of the magnetic field, and as a result, the first rotation member 4 and the second rotation member 5 are formed having different shapes, that is, having the different thicknesses W. Thus, the first rotation member 4 and the second rotation member 5 can be made having required optimal shapes.

(13) As illustrated in FIG. 17, if the first rotation member 4 and the second rotation member 5 are formed having the same shapes, the weight balance of the rotor 3 is improved, and functionality is effectively ensured.

(14) Since the second rotation member 5 is formed of an anisotropic magnet, a strong magnetic flux directed in a specific direction, for example, toward the north pole, in each of the second claw poles 12 is effectively generated. Since the first rotation member 4 is magnetized by the second rotation member 5, which has the strong magnetic force, the strong magnetic flux directed in a specific direction, for example, toward the south pole, can be also generated in the first rotation member 4. Thus, the torque of the rotor 3, that is, of the motor 1 is effectively ensured.

(15) If the second rotation member 5 is a sintered magnet or a bonded magnet, the second rotation member 5 can be formed by either of compression molding and injection molding, for example. Therefore, the manufacturing method is not limited to one.

(16) The second rotation member 5 can be formed also of a ferrite magnet, a samarium cobalt magnet, a samarium iron nitride magnet, a neodymium magnet or an alnico magnet. Therefore, the second rotation member 5 can be manufactured also with any of these general-purpose materials.

(17) The first rotation member 4 is formed of a soft magnetic material with high rigidity such as soft iron, metal glass, Permendur, amorphous and the like. Accordingly, the first rotation member 4 can be firmly fixed to the shaft 7. Thus, the second rotation member 5 attracted to the first rotation member 4 by a magnetic force does not easily shift in the rotor circumferential direction with respect to the shaft 7.

(18) The outer peripheral surface of the second rotation member 5 has one of magnetic poles, while the axial perpendicular face of the second rotation body 11 has the other magnetic pole. Thus, since the magnetic material generating the magnetic flux in the second rotation member 5 can be arranged to the center portion in the rotor radial direction of the second rotation member 5, the particles of the magnetic material of the second rotation member 5 increase, and the magnetic flux amount is increased.

(Fifth Embodiment)

A fifth embodiment will now be described with reference to FIGS. 18 and 19. The fifth embodiment is a configuration in which the rotor structure described in the fourth embodiment is changed, while the other basic configurations are the same as those in the fourth embodiment. Thus, the same portions as those in the fourth embodiment are given the same reference numerals and detailed description will be omitted, while only differences will be described in detail.

Figure 18:
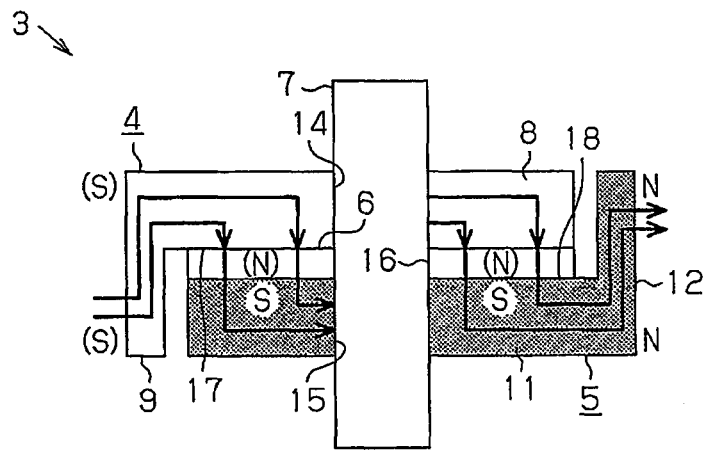
FIG. 18 is an exemplifying cross-sectional view illustrating the magnetic field generated in a rotor of a fifth embodiment.
Figure 19:
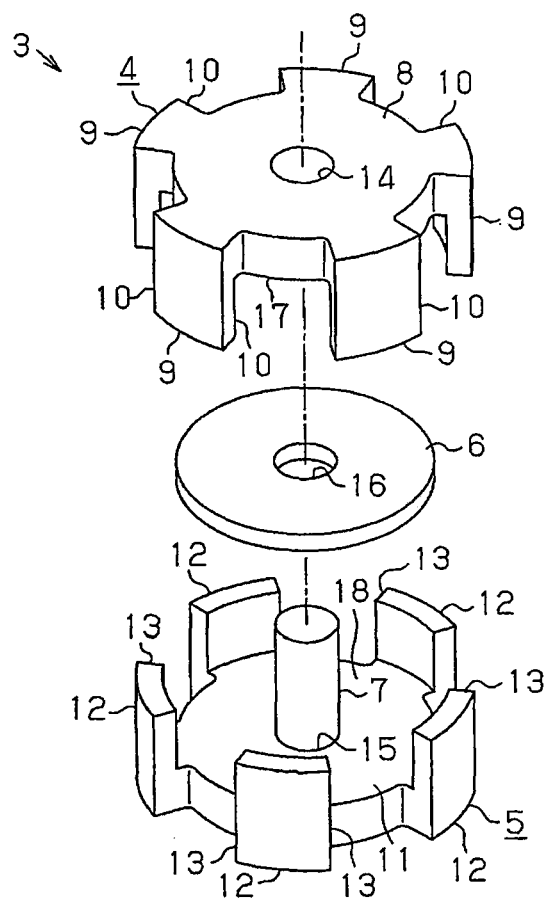
FIG. 19 is an exploded perspective view illustrating the component configuration of the rotor in FIG. 18.

As illustrated in FIGS. 18 and 19, between a pair of rotation members 4 and 5, a substantially plate-shaped soft magnetic material 6 is provided for fixing the rotation members 4, 5. The soft magnetic material 6 has a ring shape and is formed of any one of soft iron, metal glass, Permendur, and amorphous. In the soft magnetic material 6, a central through hole 16 is provided through which a shaft 7 is inserted, and the soft magnetic material 6 is press-fitted and fixed to the shaft 7.

The first rotation member 4 of the fifth embodiment may be attached and fixed to the soft magnetic material 6 not by press-fit fixation to the shaft 7 but by an adhesive or the like, for example. The second rotation member 5 is fixed with its position determined by being attracted to the soft magnetic material 6 by the magnetic force. Thus, in the fifth embodiment, since the first rotation member 4 can be attached to the soft magnetic material 6, which has a large area, the first rotation member 4 and the second rotation member 5 can be firmly assembled.

According to the configuration of the fifth embodiment, in addition to (11) to (18) in the fourth embodiment, the advantages described below are achieved.

(19) The first rotation member 4 and the second rotation member 5 are attached and fixed to the shaft 7 by using the soft magnetic material 6. Thus, since the attachment area of the first rotation member 4 or the second rotation member 5 can be taken large, attachment strength of the first rotation member 4 and the second rotation member 5 to the soft magnetic material 6 is effectively ensured and a positional shift with respect to the shaft 7 is effectively prevented.

(Sixth Embodiment)

A sixth embodiment will now be described with reference to FIGS. 20 to 23. The sixth embodiment is different from the fourth and fifth embodiments in a point that the rotor 3 has a tandem structure, that is, a laminated structure, while the other basic configurations are the same as those in the fourth and fifth embodiments. Thus, again, only the differences will be described in detail in the sixth embodiment.

Figure 20:
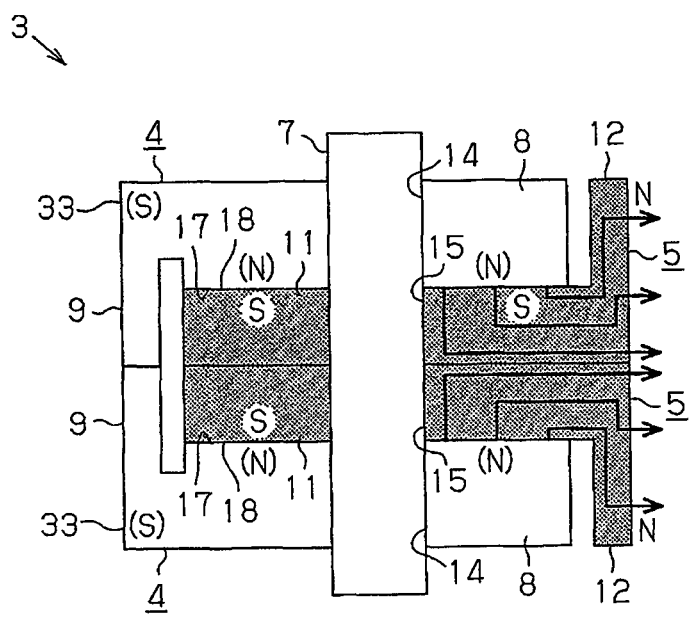
FIG. 20 is an exemplifying cross-sectional view illustrating the magnetic field generated in a rotor in a sixth embodiment.

As illustrated in FIG. 20, the rotor 3, which has a tandem structure, is composed of a plurality of (two in this case) rotor units 31. The rotor unit 31 in the sixth embodiment is the same as the rotor 3 described in the fourth embodiment. In the case of the tandem structure, these rotor units 31 are arranged vertically opposite to each other in the axial direction of the rotor 3 and attached so that the north poles or the south poles contact each other.

Figure 21:
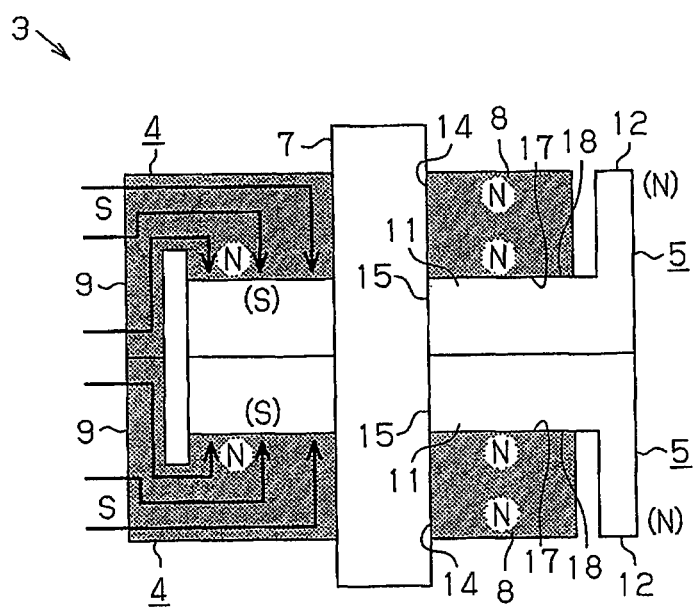
FIG. 21 is an exemplifying cross-sectional view illustrating the magnetic field generated in the rotor in a modification.

Since the sixth embodiment has a plurality of the rotor units 31, the north pole and the south pole, each having a large area, are formed on the outer peripheral surface of the rotor 3. Thus, the torque of the rotor 3 can be set higher, and the motor 1 with a high output can be used. In the case of this structure, as illustrated in FIG. 21, the magnet and the soft magnetic material may be switched with respect to the arrangement in FIG. 20.

Figure 22:
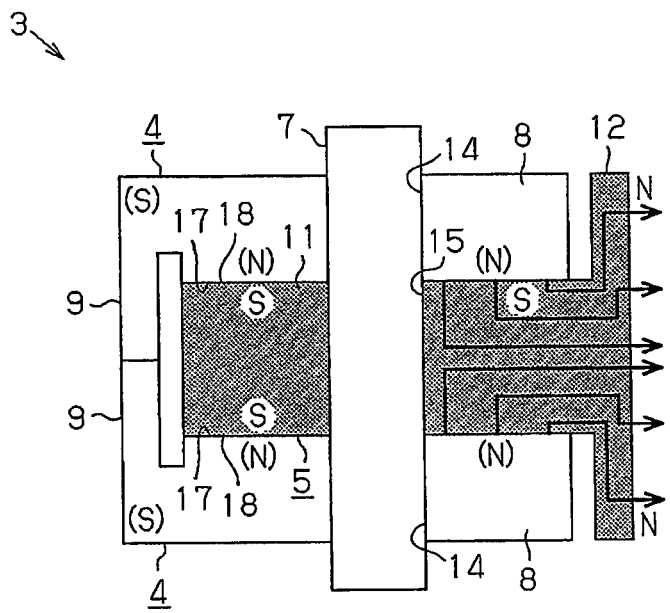
FIG. 22 is an exemplifying cross-sectional view illustrating the magnetic field generated in the rotor in a modification.
Figure 23:
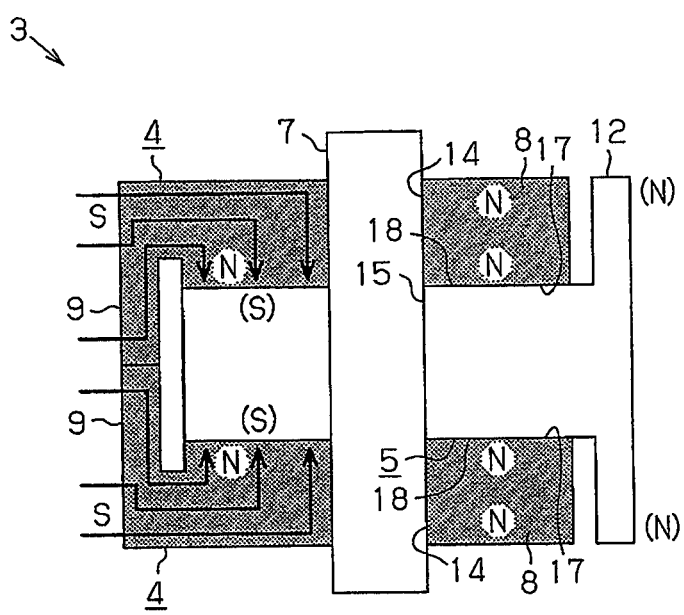
FIG. 23 is an exemplifying cross-sectional view illustrating the magnetic field generated in the rotor in a modification.
Figure 24:
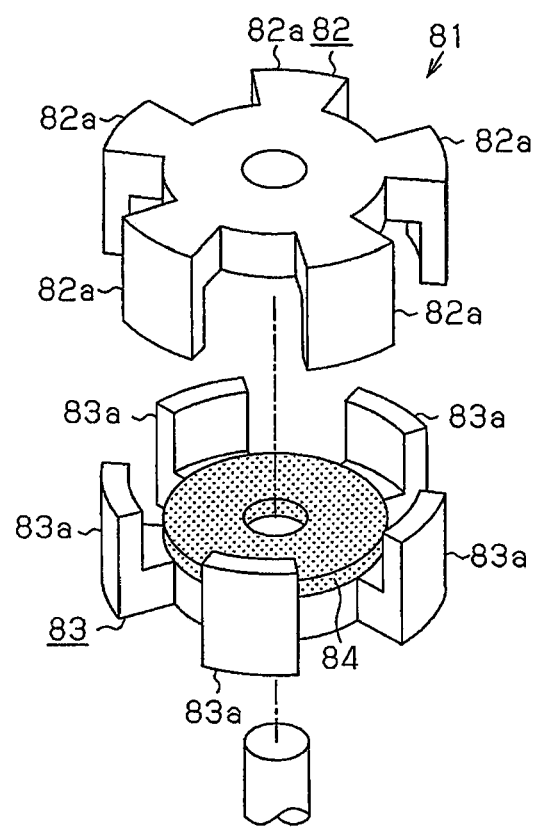
FIG. 24 is an exploded perspective view illustrating a component configuration of a rotor of a general technology.

In the case of the tandem structure, as illustrated in FIG. 22, the second rotation members 5 in contact with the same members may be formed integrally. That is, in FIG. 22, the second rotation members 5, which are both magnets, are formed integrally. In this case, in the rotor 3, which has a tandem structure, the number of components can be kept small. As illustrated in FIG. 23, the magnet and the soft magnetic material may be switched with respect to the arrangement in FIG. 22. That is, in FIG. 23, the second rotation members 5 as the soft magnetic materials are integrally formed. The first rotation members 4 may be formed integrally.

According to the configuration of this embodiment, in addition to (11) to (18) of the fourth embodiment, the advantages described below are achieved.

(20) In the tandem structure of the rotor units 31, since the area of the north poles and the area of the south poles on the outer peripheral surface of the rotor 3 can be made larger, the torque is effectively improved. The magnetic flux amount passing through the rotor 3 increases, and this also contributes to improvement of the torque.

(21) As illustrated in FIGS. 20 and 21, the two rotor units 31 are attached and fixed to the shaft 7 with such direction that the first rotation member 4 of the outer-peripheral south pole or the second rotation member 5 of the outer-peripheral north pole is located outside in the axial direction, and the second rotation member 5 of the outer-peripheral north pole or the first rotation member 4 of the outer-peripheral south pole is located inside in the axial direction. Thus, since a wide passage for a magnetic flux can be formed in a spot where the two rotor units 31 contact each other, the advantage of improving the torque is higher.

(22) As illustrated in FIGS. 22 and 23, in the two rotor units 31, if the members with the same polarity in contact with each other inside in the axial direction among the first rotation member 4 and the second rotation member 5 are integrated, members that are originally assumed to be two components, can be one component. Thus, the number of components required for the rotor 3 can be kept small.

In the sixth embodiment, the number of rotor units 31 is not limited to two but may be three or more.

In the sixth embodiment, in the case of the tandem structure, the pair of rotor units 31 may be stacked in a direction where different magnetic poles contact each other.

In the fourth to sixth embodiments, the fixing method of the soft magnetic material, that is, the first rotation member 4 to the shaft 7 is not limited to press-fit fixation, and other mounting methods may be employed.

In the fourth to sixth embodiments, the shaft 7 may be integrally formed with the first rotation member 4 as the soft magnetic material or if the second rotation member 5 is a soft magnetic material, it may be integrally formed with the second rotation member 5.

In the fourth to sixth embodiments, the number of the claw poles 9 and 12 is not limited to the numbers described in the embodiment and may be changed to other numbers. Particularly, the number of pole pairs of the rotor is preferably an odd number of three or more, because the first rotation member 4 and the second rotation member 5 are difficult to be deformed, and the rotor 3 is made stable.

In the fourth to sixth embodiments, the direction of the magnetic moments formed in the first rotation member 4 and the second rotation member 5 may be changed as appropriate.

In the fourth to sixth embodiments, the shapes and the materials of the rotation members 4 and 5 and the soft magnetic material 6 may be changed as appropriate to those other than those described in the above-described embodiments.

In the fourth to sixth embodiments, the first rotation member 4 may be formed of a magnet, and the second rotation member 5 may be formed of a soft magnetic material.

In the fourth to sixth embodiments, the soft magnetic material, which is a material of the rotation member, is not limited to iron and may be changed to other types of materials.

The invention claimed is:

1. A rotor comprising:
a first rotation member having a plurality of first claw poles in a circumferential direction; and
a second rotation member having a plurality of second claw poles in the circumferential direction, wherein
the first rotation member and the second rotation member are engaged with each other such that each second claw pole is fitted in a cutout portion between first claw poles and each first claw pole is fitted in a cutout portion between second claw poles,
at least either one of the first rotation member and the second rotation member is formed of a magnet, and
the first claw poles and the second claw poles have north poles and south poles based on a magnetic field generated by the magnet, wherein the north and south poles alternate in the circumferential direction.

2. The rotor according to claim 1, wherein
the first rotation member and the second rotation member are each formed of a magnet, and
the north poles and south poles are based on magnetic fields generated by the magnets.

3. The rotor according to claim 1, wherein
either one of the first rotation member and the second rotation member is formed of a soft magnetic material, the other is formed of a magnet, and
the soft magnetic material has a magnetic pole by the magnetic pole of the magnet.

4. The rotor according to claim 3, wherein the first rotation member and the second rotation member have shapes that are different from each other.

5. The rotor according to claim 3, wherein the first rotation member and the second rotation member have shapes that are the same.

6. The rotor according to any one of claim 1, wherein the magnet is an anisotropic magnet, which is magnetized in a specific direction.

7. The rotor according to any one of claim 1, wherein the rotor is configured to be attached to a shaft, the rotor further has a plate-shaped soft magnetic material, which is attached and fixed to the shaft and is located between the first rotation member and the second rotation member, and
the soft magnetic material is configured as a positioning member, which determines the positions of the first rotation member and the second rotation member.

8. The rotor according to claim 7, wherein the soft magnetic material is soft iron, metal glass, Permendur or amorphous.

9. The rotor according to any one of claim 1, wherein the soft magnetic material is not provided between the first rotation member and the second rotation member, and
the first rotation member and the second rotation member are directly attached to the shaft.

10. The rotor according to any one of claim 1, wherein the magnet is a sintered magnet or a bond magnet.

11. The rotor according to any one of claim 1, wherein the magnet is a ferrite magnet, a samarium cobalt magnet, a samarium iron nitride magnet, a neodymium magnet or an alnico magnet.

12. The rotor according to any one of claim 1, wherein the rotor has a tandem structure in which a plurality of rotor units, each being composed of sets of the first rotation member and the second rotation member, are laminated in an axial direction such that poles of the same polarity contact each other.

13. The rotor according to claim 12, wherein the first rotation members and the second rotation members of the rotor units are formed such that a member located outside in the axial direction and a member located inside in the axial direction have the same magnetic polarity.

14. The rotor according to claim 12, wherein, among the first rotation members and the second rotation members in the rotor units, two members that have the same polarity and contact each other inside in the axial direction are integrated.

15. A motor comprising:
a rotor having a first rotation member having a plurality of first claw poles in a circumferential direction and a second rotation member having a plurality of second claw poles in the circumferential direction; and
a stator rotationally supporting the rotor, wherein the first rotation member and the second rotation member are engaged with each other such that each second claw pole is fitted in a cutout portion between first claw poles and each first claw pole is fitted in a cutout portion between second claw poles, by forming at least either one of the first rotation member and the second rotation member of a magnet, the first claw poles and the second claw poles have alternating north poles and south poles in the circumferential direction based on a magnetic field generated by the magnet.

* * * * *